United States Patent

Maruo et al.

[11] Patent Number: 5,184,053
[45] Date of Patent: Feb. 2, 1993

[54] CONTROL DEVICE FOR A TOOL DRIVING UNIT

[75] Inventors: Satoshi Maruo, Gifu; Chikamasa Hattori, Ichinomiya; Fumio Kameyama, Nagoya, all of Japan

[73] Assignee: Brother Kogyo Kabushiki Kaisha, Nagoya, Japan

[21] Appl. No.: 679,101

[22] Filed: Apr. 2, 1991

[30] Foreign Application Priority Data

May 31, 1990 [JP] Japan .................................. 2-144029

[51] Int. Cl.$^5$ .............................................. G05B 19/18
[52] U.S. Cl. ..................................... 318/571; 318/569; 318/600; 318/39; 364/424.11; 364/474.15; 364/474.3
[58] Field of Search ............... 318/560, 561, 567, 569, 318/570, 571, 625, 590, 600, 34-35, 39, 41, 49; 364/474.01, 474.11, 474.28, 474.15, 474.3

[56] References Cited

U.S. PATENT DOCUMENTS

| | | |
|---|---|---|
| 3,623,823 | 11/1971 | Val . |
| 3,640,147 | 2/1972 | Fantoni . |
| 4,099,106 | 7/1978 | Nikaido . |
| 4,353,018 | 10/1982 | Kohzai et al. . |
| 4,386,305 | 5/1983 | Kohzai et al. ........................ 318/571 |
| 4,691,787 | 9/1987 | Akesaka . |
| 4,692,071 | 9/1987 | Hirota . |
| 4,789,943 | 12/1988 | Yamanaka et al. ............. 318/571 X |
| 4,813,821 | 3/1989 | Hirota . |
| 4,879,660 | 11/1989 | Asakura et al. ................ 318/571 X |
| 4,992,711 | 2/1991 | Sugita et al. ......................... 318/561 |
| 4,992,712 | 2/1991 | Fujimoto et al. .................... 318/569 |
| 5,100,271 | 3/1992 | Kameyama et al. ................ 409/231 |

FOREIGN PATENT DOCUMENTS

| | | |
|---|---|---|
| 0092378 | 4/1983 | European Pat. Off. . |
| 0171437A1 | 2/1986 | European Pat. Off. . |
| 0207172A1 | 1/1987 | European Pat. Off. . |
| 0258641A2 | 3/1988 | European Pat. Off. . |
| 1141217 | 1/1969 | United Kingdom . |
| 2086777 | 5/1982 | United Kingdom . |
| 2097191 | 10/1982 | United Kingdom . |
| 2097197 | 10/1982 | United Kingdom . |
| 2202649A | 9/1988 | United Kingdom . |

OTHER PUBLICATIONS

*Servo Control with Microprocessor*, IBM Technical Disclosure Bulletin, vol. 31, No. 11, Apr. 1989, pp. 101-103.

Primary Examiner—A. Jonathan Wysocki
Assistant Examiner—David Martin
Attorney, Agent, or Firm—Oliff & Berridge

[57] ABSTRACT

A control device for a tool driving unit is disclosed wherein a tool such as a tap or a drill is controlled to be rotated and axially moved by the control device. The tool driving unit has a spindle servo motor adapted to be driven according to a spindle current command and a feed shaft servo motor adapted to be driven according to a feed shaft current command which are provided by a single microcomputer which operates as the control device. The microcomputer reads an NC program and outputs a spindle command for the spindle servo motor when performing tapping, and outputs both the spindle command and a first feed shaft command for the feed shaft servo motor when performing drilling. A thread pitch changing controller for controlling a thread pitch outputs a second feed shaft command for the feed shaft servo motor when performing tapping. A tool selector receives the first feed shaft command and the second feed shaft command and outputs a selected feed shaft command based on the tooling operation being performed. The spindle and feed shaft servo motors are controlled based on the provided command(s) and by detecting actual angular positions and rotational speeds of the servo motors.

22 Claims, 9 Drawing Sheets

CONTROL DEVICE FOR A TOOL DRIVING UNIT

BACKGROUND OF THE INVENTION

1. Field of the Invention

The present invention relates to a control device for a tool driving unit such as a tapping unit for machining a workpiece by means of a tool, and more particularly to a control device for a tool driving unit wherein a tool such as a tap, drill, or reamer which is held by a chuck mounted at a front end of a spindle is controlled to be advanced or retracted while being rotated.

2. Discussion of the Related Art

A conventional tool driving unit such as a tapping unit or a drill unit has a tool such as a tap or drill which is held by a chuck mounted at a front end of a spindle. A rotational driving mechanism is provided for rotating the spindle around a central axis thereof, and a feed driving mechanism is provided for longitudinally moving the spindle along its central axis so that the spindle is advanced or retracted while being rotated. In this conventional tool driving unit, a single motor is employed to power both the rotational driving mechanism and the feed driving mechanism. A torque is transmitted from an output shaft of the motor through the rotational driving mechanism which includes, for example, gears and belts to a spindle so as to rotate the spindle. Torque is converted into a feed driving force by the feed driving mechanism which includes, for example, a ball thread or a rack and pinion to move the spindle longitudinally along its central axis, thereby carrying out a desired tapping or drilling operation.

However, such a conventional tool driving unit is relatively large due to the size of the rotational and feed driving mechanisms, and has a large number of parts constituting the torque transmitting mechanisms. Additionally, a mechanical backlash tends to occur in the feed driving mechanism, causing a reduction in position accuracy for machining. Further, when replacing one tool with another, it is necessary to replace portions of the transmitting mechanisms, such as gears, as well as the tool, so as to obtain operating speeds suitable for different tools used therewith. For example, when performing a drilling operation, the spindle is rotated at a high speed and moved longitudinally at a relatively low speed, while when performing a tapping operation, the spindle is rotated and moved longitudinally at relatively low speeds. Thus, it is difficult to reduce a cost of operating the tool driving unit.

Another conventional tool driving unit has, as disclosed in U.S. Pat. Nos. 4,813,821, and 4,692,071, an arithmetic unit which acts as a control device for controlling the tool driving unit, a position detecting/control unit, and a speed detecting/control unit for controlling the speed and position of the spindle. The control device for the tool driving unit, the position detecting/control unit, and the speed detecting/control unit for the spindle are usually constructed from analog circuits. Accordingly, there is a possibility of deterioration and offset of an operational amplifier used therewith over time, for example, and it is therefore necessary to individually adjust control settings of the control system.

OBJECTS AND SUMMARY OF THE INVENTION

It is an object of the present invention to overcome the above-described drawbacks and disadvantages, and to provide a tool driving unit control device which can be operated with less frequent adjustment and, accordingly, at reduced operating cost.

To attain these and other objects, and to overcome the shortcomings discussed above, according to the present invention, there is provided a control device for a tool driving unit which controls the rotational and longitudinal movements of a tool mounted at a front end of a spindle so that the tool is rotated around a central axis of the spindle and longitudinally fed along the central axis of the spindle by a feed shaft. The tool driving unit control device includes a microcomputer which is capable of outputting a spindle command for driving a spindle servo motor and capable of outputting a feed shaft command for driving a feed shaft servo motor. The spindle command includes a spindle angular position command, a spindle speed command, and a spindle current command. The feed shaft command includes a feed shaft angular position command, a feed shaft speed command, and a feed shaft current command. The microcomputer comprises: spindle position control means for detecting a first angular position of said spindle servo motor, computing a first positional difference between said first angular position detected and said spindle command, and for outputting a spindle speed command for said spindle servo motor based on said first positional difference; spindle speed control means for detecting a first rotational speed of said spindle servo motor, computing a first speed difference between said first rotational speed and said spindle speed command, and for outputting a spindle current command based on said first speed difference; feed shaft position control means for detecting a second angular position of said feed shaft servo motor, computing a second positional difference between said second angular position detected and said feed shaft command, and for outputting a feed shaft speed command for said feed shaft servo motor based on said second positional difference; and feed shaft speed control means for detecting a second rotational speed of said feed shaft servo motor, computing a second speed difference between said second rotational speed and said feed shaft speed command, and for outputting a feed shaft current command based on said second speed difference.

BRIEF DESCRIPTION OF THE DRAWINGS

The foregoing and other objects, features and advantages of the present invention will become more apparent by reading the following detailed description of a presently preferred embodiment of the present invention, when considered in connection with the accompanying drawings, in which.

DETAILED DESCRIPTION OF THE PREFERRED EMBODIMENT

Figure 1:
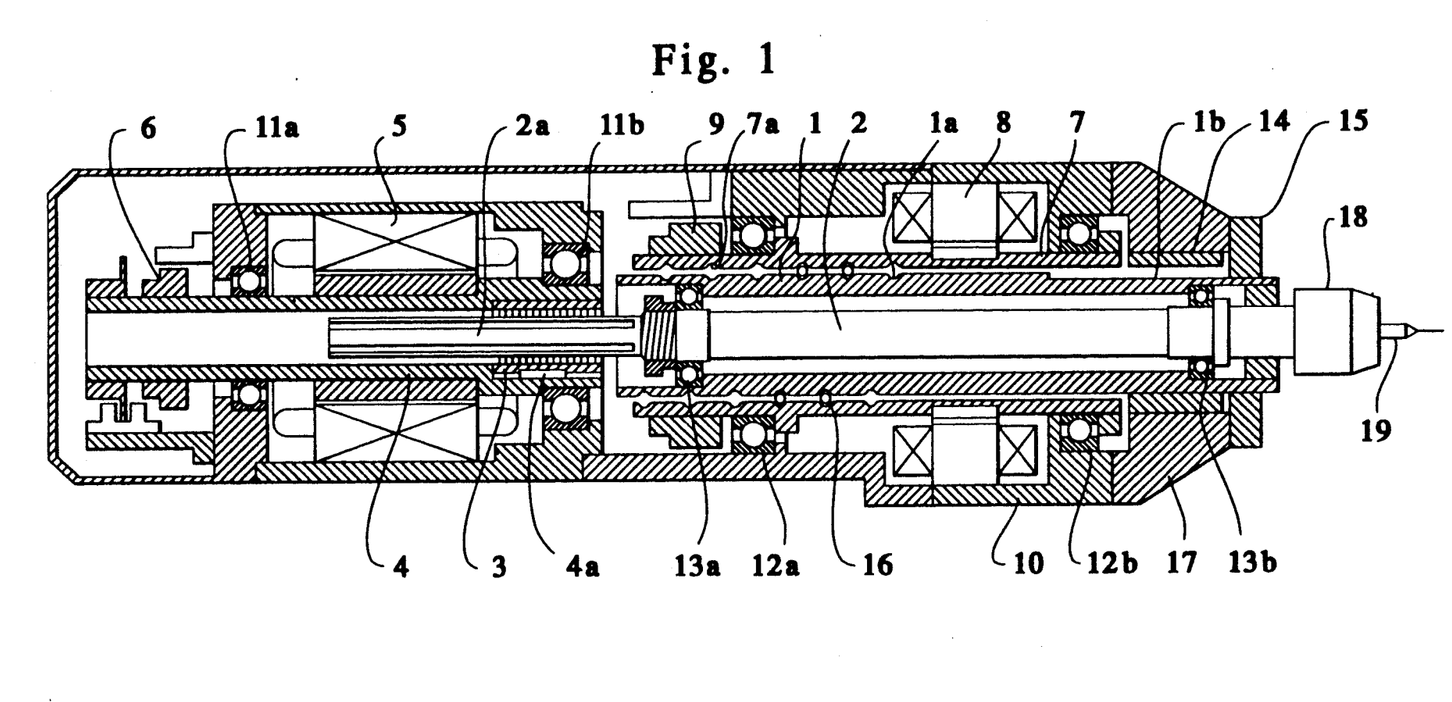
FIG. 1 is a vertical sectional view of a tool driving unit to which the control device of the present invention is applied by way of example.

There will now be described in detail a preferred embodiment of a tool driving unit control device according to the present invention with reference to FIGS. 1–5(e). First, a tool driving unit to which the control device of the present invention can be applied will be described. FIG. 1 is a vertical sectional view of a tool driving unit to which the control device of the present invention can be applied by way of example. The tool driving unit shown in FIG. 1 is also shown in FIG. 10 of U.S. Pat. No. 5,100,271 to Fumio Kameyama et al, the disclosure of which is herein incorporated by reference.

Referring to FIG. 1, a hollow cylindrical quill 1 which is used as a feed shaft is inserted through a sliding bearing 14 in an axially central portion of a cylindrical housing 10 where a head cover 17 is fixed at the front end portion thereof. The hollow quill 1 is formed at its outer circumference with an engaging portion 1b which is engaged with a rotation restricting member 15 for restricting rotation of the quill 1 so as to permit only axial sliding of the quill relative to the rotation restricting member 15. Further, the hollow quill 1 includes an external thread groove 1a formed along a desired axial length of its outer circumference.

A spindle 2 is rotatably supported through a pair of rolling bearings 13a and 13b in the hollow quill 1. A front end of the spindle 2 projects outwardly from the front end of the hollow quill 1. A chuck 18 for holding a tool such as a tap 19 is mounted on the front end of the spindle 2. A rear end portion of the spindle 2 projects sufficiently from the rear end of the hollow quill 1. This projecting portion of the spindle 2 includes a plurality of axial spline grooves formed in its outer circumference to form a spline shaft portion 2a which functions as a torque receiving portion.

A second hollow rotor 7 is mounted on the outer circumferential surface of the hollow quill 1 so as to be rotatable in relation to the housing 10 through a pair of rolling bearings 12a and 12b. The second hollow rotor 7 includes an internal thread groove 7a formed in its inner circumference which faces the external thread groove 1a of the hollow quill 1. A plurality of balls 16, which engage with each other, are interposed between the external thread groove 1a and the internal thread groove 7a in a circulating or non-circulating manner.

If an axial length of the internal thread groove 7a of the second hollow rotor 7 were short, there is a possibility that the balls 16 would move to and slip at a terminal end of the internal thread groove 7a. It is therefore preferable to make the axial length of the internal thread groove 7a relatively long, so as to allow the balls 16 to move between the external thread groove 1a and the internal thread groove 7a without slippage. If the axial length of the internal thread groove 7a cannot be made sufficiently long, a mechanism for allowing the balls 16 to circulate can be provided (as is common with ordinary ball screw mechanisms) to allow the balls 16 to move between the external thread groove 1a and the internal thread groove 7a without slippage.

Furthermore, it is preferable to make an outer diameter of each ball 16 slightly larger than the space provided between the external thread groove 1a and the internal thread groove 7a, so that the balls 16 contact the inner surfaces of the grooves 1a and 7a at four points. Accordingly, a pre-load can be applied between the hollow quill 1 and the second hollow rotor 7 to thereby eliminate slippage and prevent backlash between the quill 1 and the rotor 7, thereby improving the rigidity of the tool driving unit under an assembled condition. The four-point contact and preload are illustrated and described in more detail in the above-incorporated U.S. Pat. No. 5,100,271.

A feed shaft servo motor 8 is provided between the inner circumferential surface of the cylindrical housing 10 and the outer circumferential surface of the second hollow rotor 7. The feed shaft servo motor 8 is controlled to be selectively rotated in a forward or reverse direction so as to rotate rotor 7 in the forward or reverse direction for the purpose of advancing or retracting the spindle 2 via the hollow quill (or feed shaft) 1. A second angular position/rotational speed detector 9, which can be, for example, an encoder for detecting an angular position and rotational speed of the rotor 7 is mounted on the outer circumferential surface of the rotor 7 at the rear end portion thereof.

A first hollow rotor 4 surrounds the spline shaft portion 2a of the spindle 2, and is rotatably supported through a pair of rolling bearings 11a and 11b to the housing 10. A ball spline sleeve 3 engages the first hollow rotor 4 at a front end portion thereof in such a manner that relative rotation of the sleeve 3 with respect to the rotor 4 is prohibited by a key 4a. The ball spline sleeve 3 includes a plurality of axial spline grooves on its inner surface which face the axial spline grooves of the spline shaft 2a to form a torque transmitting portion. A plurality of balls which function as torque transmitting elements are interposed between the internal spline grooves of the sleeve 3 (and the external spline grooves of the spline shaft portion 2a, so as to permit axial sliding of the spline shaft portion 2a (and thus, the spindle 2) relative to the sleeve 3 (and thus the first hollow rotor 4) while simultaneously permitting the transmission of a torque from the rotor 4 through the sleeve 3 to the spline shaft portion 2a. Accordingly, spline shaft portion 2a and spindle 2 rotate with the rotation of first hollow shaft 4, but can also move longitudinally relative to hollow shaft 4, along their central axis.

A spindle servo motor 5 is provided between the inner circumferential surface of the cylindrical housing 10 and the outer circumferential surface of the first hollow rotor 4. The spindle servo motor 5 is controlled to be selectively rotated in a forward or reverse direction for the purpose of rotationally driving first hollow shaft 4, and consequently to rotate the spindle 2. A first angular position/rotational speed detector 6, which can be, for example, an encoder for detecting an angular position and a rotational speed of the rotor 4 is mounted on the outer circumferential surface of the rotor 4 at the rear end portion thereof.

Angular position/rotational speed detectors 6 and 9 can be, for example, pulse generators, resolvers or rotary encoders.

Thus, the spindle servo motor 5 and the feed shaft servo motor 8 are arranged in coaxial relationship with each other to construct a so-called single spindle type tool driving unit.

The operation of the above-mentioned tool driving unit is described below. When the spindle servo motor 5 is driven to rotate the first hollow rotor 4 in a forward direction (or a reverse direction), the spindle 2 is rotated in the forward direction (or the reverse direction) via the force transmitted through the ball spline sleeve 3. At this time, an angular position and rotational speed of the first hollow rotor 4 is detected by the first detector 6. The detected angular position and rotational speed are employed as angular position and rotational speed feedback data for use in controlling the movement of spindle 2.

Feed shaft servo motor 8 is driven to rotate second hollow rotor 7 in a forward or a reverse direction to cause feed shaft (or quill) 1, and consequently spindle 2, to move longitudinal along its central axis to extend from or retract towards housing 10. An angular position and rotational speed of second hollow rotor 7 is detected by second detector 9. The detected angular position and rotational speed are used as feedback data for controlling the longitudinal movement of spindle 2.

Feed shaft servo motor 8 can be driven independently, or in synchronism with spindle servo motor 5. For example, when a drilling operation is being performed, feed shaft servo motor 8 can be driven independently of spindle servo motor 5 because it is not necessary or critical for the longitudinal and rotational speeds of the spindle 2 to be precisely matched. However, when performing a tapping operation wherein threads are formed on a workpiece, the longitudinal and rotational speeds of the spindle must be precisely matched so as to form threads on the workpiece having a predetermined pitch. Accordingly, the feed shaft servo motor 8 should be controlled synchronously with the spindle servo motor 5 when tapping is performed.

A torque of the second hollow rotor 7 obtained by driving the feed shaft servo motor 8 is transmitted through the balls 16 interposed between the internal thread groove 7a and the external thread groove 1a to the hollow quill (feed shaft) 1. Since the hollow quill is restricted from being rotated relative to the cylindrical housing 10 by means of the rotation restricting member 15, the torque transmitted to the hollow quill 1 is converted into an axial driving force in the advancing direction (or the retracting direction). Accordingly, the hollow quill 1 is advanced (or retracted) by the axial driving force provided by feed shaft servo motor 8. Since the spindle 2 is designed to be longitudinally moved together with the hollow quill 1, the rotationally driven spindle 2 is advanced (or retracted).

In the situation where the spindle servo motor 5 and the feed shaft servo motor 8 are synchronously driven on the basis of a predetermined working control program, i.e., an NC (numerical control) program, the forward and reverse rotational drive of the spindle 2 provided by the spindle servo motor 5 and the advancing and retracting drive of the spindle 2 provided by the feed shaft servo motor 8 are synchronously controlled to easily and precisely perform a tapping operation of a workpiece by the tap 19 held by the chuck 18 mounted at the front end of the spindle 2. In the tapping operation, operating conditions such as a tap cutting speed, tapping depth and tap withdrawing speed are used in conjunction with the angular position and rotational speed feedback data provided by the first and second detectors 6 and 9 in order to control servo motors 5 and 8.

The NC program includes data indicative of the thread pitch, the feeding stroke, and the rotating speed for forward movement of the thread cutting tool, and of the thread pitch, feeding stroke, and rotating speed for withdrawing movement of the thread cutting tool in a tapping operation. See, for example, U.S. Pat. No. 4,879,660 at column 11, lines 37–41 and at column 13, lines 33–38. The data indicative of the thread pitch for forward and withdrawing movement should be the same to avoid destruction of the threads. The data indicative of the feeding stroke for forward and withdrawing movement generally should also be the same. The data indicative of the rotating speed need not be the same for forward and withdrawing movement, and is usually faster for withdrawal.

The pitch angle is based upon the data indicative of the thread pitch which defines an amount of feeding of the cutting tool along the axis of the spindle 2 during one rotation of the cutting tool around the axis of the spindle 2. See, for example, U.S. Pat. No. 4,353,018 at column 2, line 34–column 3 line 20.

A functional block diagram of the control device according to the above embodiment is described below with reference to FIG. 2. The control device shown in FIG. 2 operates to control the rotational drive of the spindle servo motor 5 and of the feed shaft servo motor 8 according to feedback data provided by the first and second detectors 6 and 9. When performing a tapping operation, the rotational speeds of the spindle servo motor 5 and the feed shaft servo motor 8 are properly controlled so that an excess load is not applied to the tap 19 and so that a predetermined thread pitch is formed. When performing a drilling operation, the rotational speed of the spindle servo motor 5 is properly controlled so that an excess load is not applied to the drill or the reamer. In the following example, the functions performed by the control device when performing tapping are primarily described.

Figure 2:
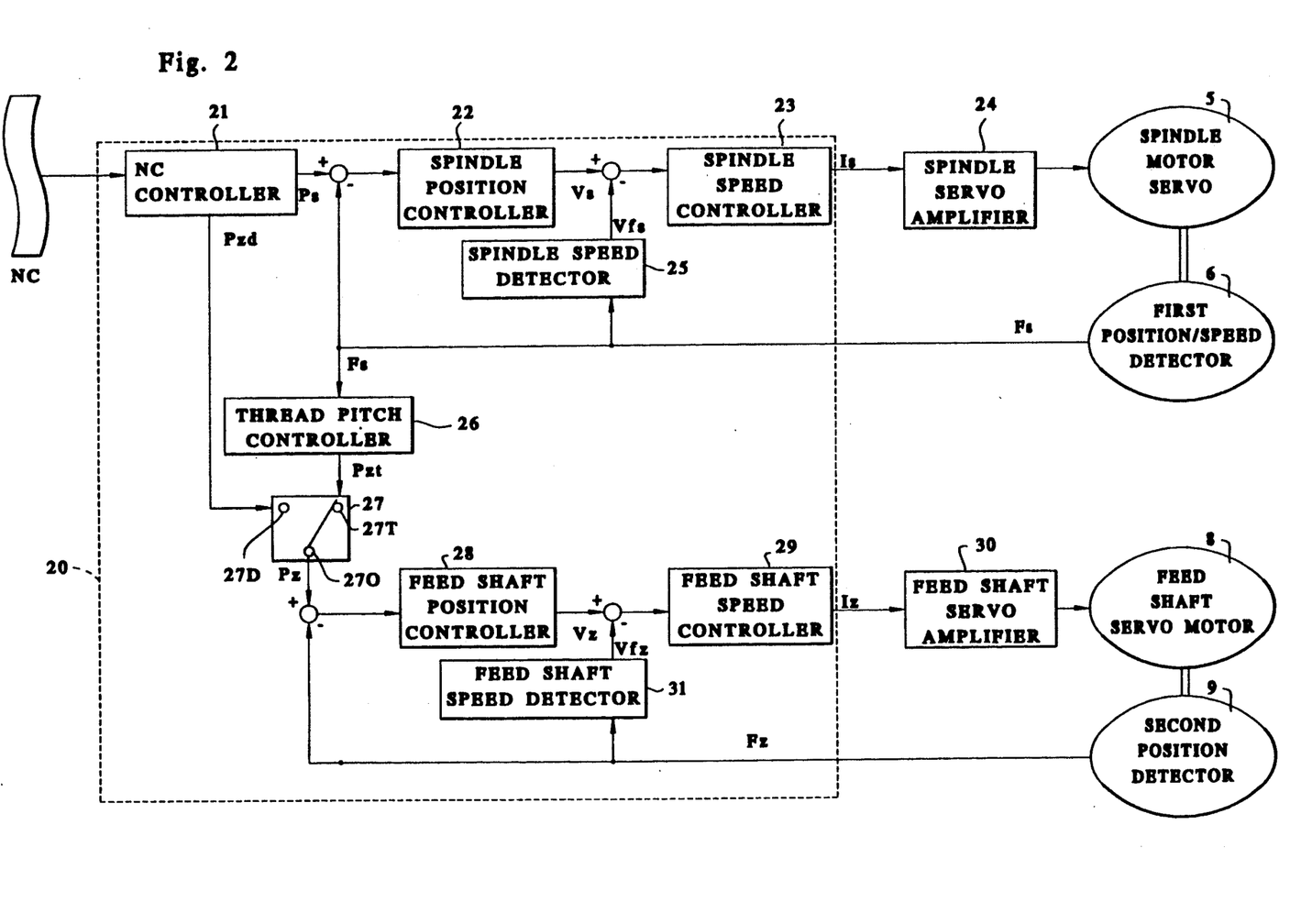
FIG. 2 is a functional block diagram of the control device according to a preferred embodiment of the present invention.

Referring to FIG. 2, the control device includes a single microcomputer 20 for executing the operational functions described below. An NC program described in NC language is read and decoded by an NC controller 21. When performing tapping, a spindle angular position command Ps for the spindle servo motor 5 is output from the NC controller 21. When performing drilling, both the spindle angular position command Ps for the spindle servo motor 5 and a drilling feed shaft angular position command Pzd for the feed shaft servo motor 8 are output from the NC controller 21. The spindle angular position command Ps and the feed shaft angular position command Pzd represent angular positions to which each respective servo motor 5 and 8 are to be moved.

A difference between the spindle angular position command Ps output from the NC controller 21 and a spindle angular position data Fs fed back from the first position detector 6 for the spindle servo motor 5 is computed and amplified by a spindle angular position controller 22, and the difference amplified is output from the spindle angular position controller 22 as a spindle speed command Vs for the spindle servo motor 5. The spindle speed command Vs represents a speed at which the spindle servo motor 5 should be operated in order for the spindle servo motor 5 to reach the commanded angular position Ps. A spindle speed data Vfs which represents the current actual speed of spindle servo motor 5 is detected by a spindle speed detector 25 on the basis of the spindle angular position data Fs fed back from the first angular position detector 6. For example, when the spindle angular position data is provided as pulses, the frequency of these pulses can be used by spindle speed detector 25 to determine the current rotational speed of spindle servo motor 5. A difference between the spindle angular speed command Vs output from the spindle position controller 22 and the spindle speed data Vfs output from the spindle speed detector 25 is computed and amplified by a spindle speed controller 23, and is output therefrom as a spindle current command Is. The spindle current command Is output by the spindle speed controller 23 is received by a spindle servo amplifier 24 of the current command input type. The spindle current command Is output from the spindle speed controller 23 is amplified by the spindle servo amplifier 24, and is input into the spindle servo motor 5 to rotationally drive the same.

To synchronously drive the spindle servo motor 5 and the feed shaft servo motor 8 (for example, when performing a tapping operation), the spindle position data Fs is also input into a thread pitch controller 26 for controlling a thread pitch. A tapping feed shaft angular position command Pzt is output from the thread pitch controller 26 to a tapping/drilling selector 27 where output 270 is connected to one of the inputs 27T or 27D for performing tapping or drilling, respectively. Either the tapping feed shaft angular position command Pzt or the drilling feed shaft angular position command Pzd is selectively output from the tapping/drilling selector 27 to provide a selected feed shaft angular position command Pz. The selected feed shaft angular position command Pz (as well as the tapping feed shaft angular position command Pzt and the drilling feed shaft angular position command Pzd) represents an angular position to which the feed shaft servo motor 8 is to be moved. The thread pitch controller 26 adjusts and controls the value of the tapping feed shaft angular position command Pzt so that a predetermined thread pitch will be formed on the workpiece. Alternatively, additional commands can be supplied to NC controller 21 from the NC tape which represent a desired thread pitch. These thread pitch commands can be supplied by NC controller 21 to the thread pitch controller 26 for use with the spindle angular position data Fs in determining the tapping feed shaft angular position data Pzt.

A difference between the selected feed shaft angular position command Pz output from the tapping/drilling selector 27 and a feed shaft angular position data Fz fed back from the second position detector 9 for the feed shaft servo motor 8 is computed and amplified by a feed shaft angular position controller 28. The difference amplified by feed shaft angular position controller 28 is output as a feed shaft speed command Vz for the feed shaft servo motor 8. Feed shaft speed command Vz represents a speed at which the feed shaft servo motor 8 should be operated in order for feed shaft servo motor 8 to reach the selected angular position Pz. A feed shaft speed data Vfz is detected by a feed shaft speed detector 31 on the basis of the feed shaft position data Fz fed back from the second position detector 9. Feed shaft speed detector 31 operates in a manner similar to spindle speed detector 25. A difference between the feed shaft speed command Vz output from the feed shaft angular position controller 28 and the feed shaft speed data Vfz output from the feed shaft speed detector 31 is computed and amplified by a feed shaft speed controller 29, and is output as a feed shaft current command Iz. The feed shaft current command Iz output by the feed shaft speed controller 29 is received by a feed shaft servo amplifier 30 of the current command input type. The feed shaft current command Iz output from the feed shaft speed controller 29 is amplified by the feed shaft servo amplifier 30, and is input into the feed shaft servo motor 8 to rotationally drive the same.

Figure 3:
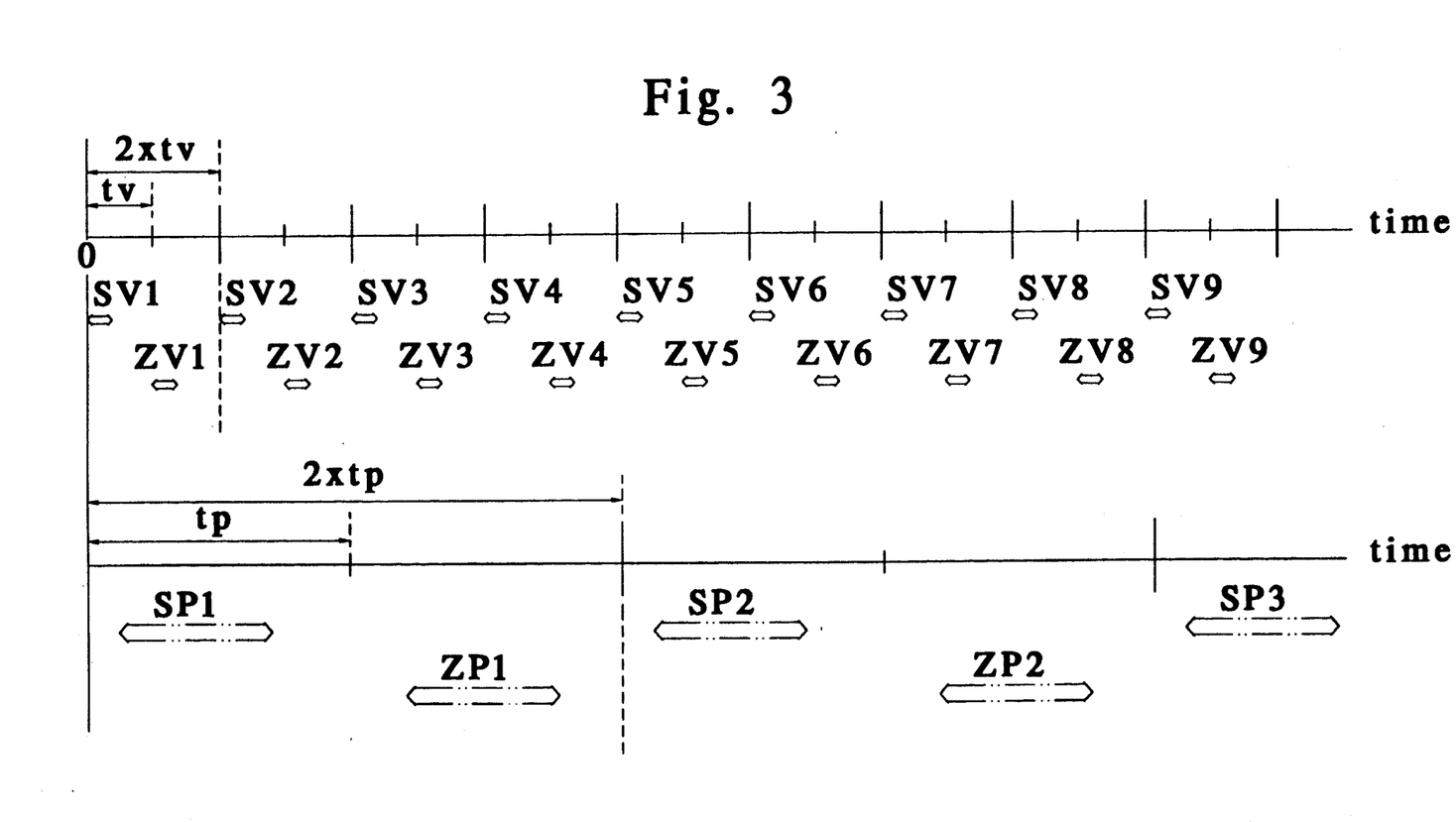
FIG. 3 is a diagram illustrating the data processing to be executed by the microcomputer.

A series of operations performed by the above-mentioned controllers and selector are executed by the single microcomputer 20 in a time-division manner, thereby properly and accurately carrying out the tapping or drilling with the tool driving unit. When executing operations in the time-division manner, microcomputer 20 continuously repeats the above-described operation. Each performance of the operations occurs within a time period, with each operation being performed once within a portion of each time period. The time sequence for controlling the servo motors 5 and 8 is illustrated in FIG. 3. As shown in FIG. 3, a processing time SV1, SV2 alternately occurs in a time division manner, and a processing time SP1, SP2 alternately occurs in a time division manner. However, the processing time SV1, SV2 is given a higher priority (occurs more often) than the processing time SP1, SP2.

Figure 4:
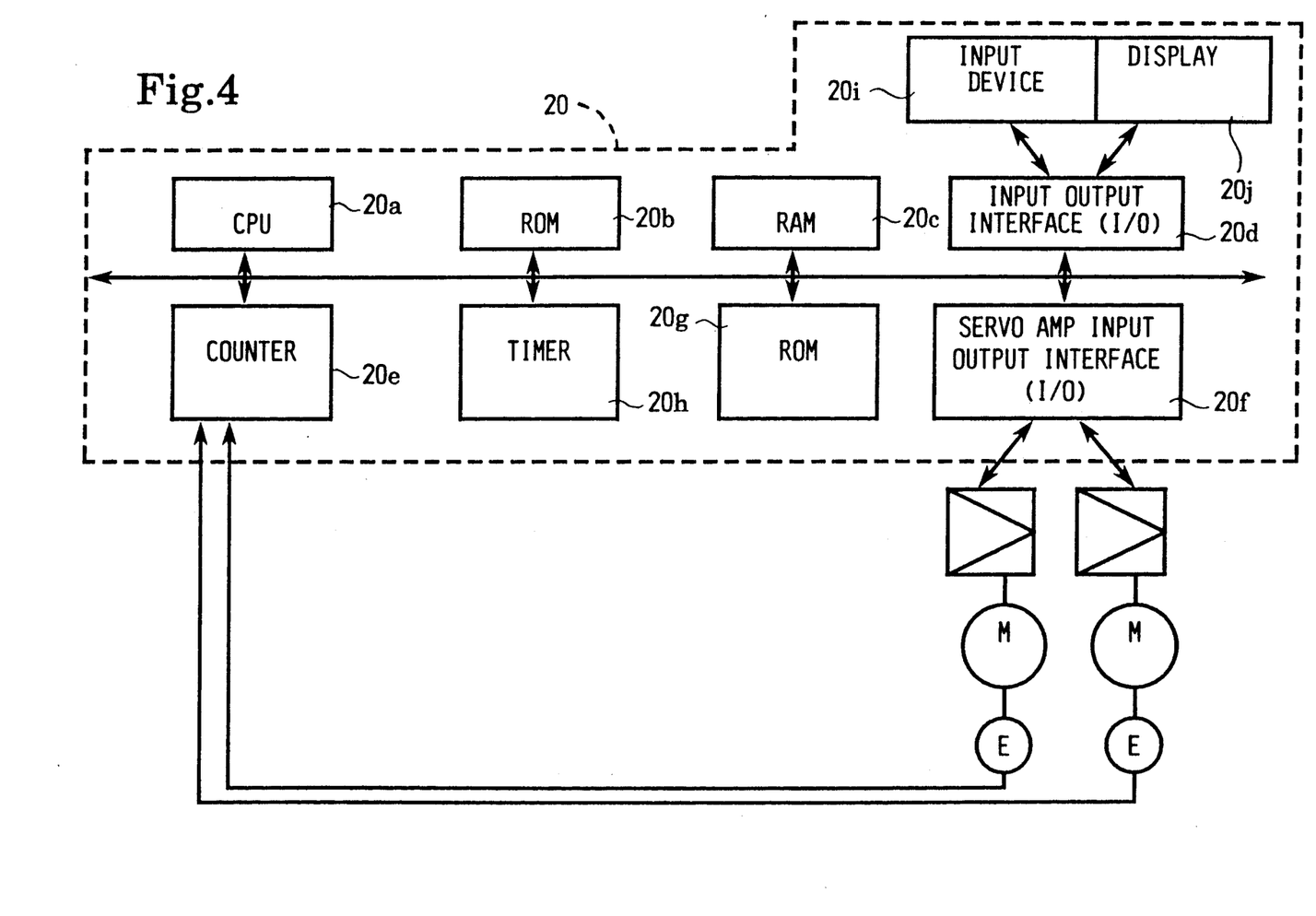
FIG. 4 is a block diagram illustrating the components of a microcomputer usable in the present invention.

A schematic diagram of the components of the single microcomputer 20 according to the above embodiment will be described with reference to FIG. 4. The single microcomputer 20 comprises a CPU 20a for controlling the operation of microcomputer 20, ROM 20b for storing control programs relating to rotational speed control and angular position control of the spindle servo motor 5 and the feed shaft servo motor 8, RAM 20c for storing a variety of data which is used to control the microcomputer 20, Input Output Interface (I/O) 20d for receiving signals from input device 20i and for outputting signals to control display 20j for displaying a variety of data. Microcomputer 20 also includes Counter 20e for use in controlling the rotational speed and angular position of the spindle servo motor 5 and the feed shaft servo motor 8, Servo AMP Input Output Interface (I/O) 20f for use in controlling the spindle servo motor 5 and the feed shaft servo motor 8, ROM 20g for storing a variety of tool driving programs, and Timer 20h for use in controlling the rotational speed and the angular position of the spindle servo motor 5 and the feed shaft servo motor 8.

Figure 5:
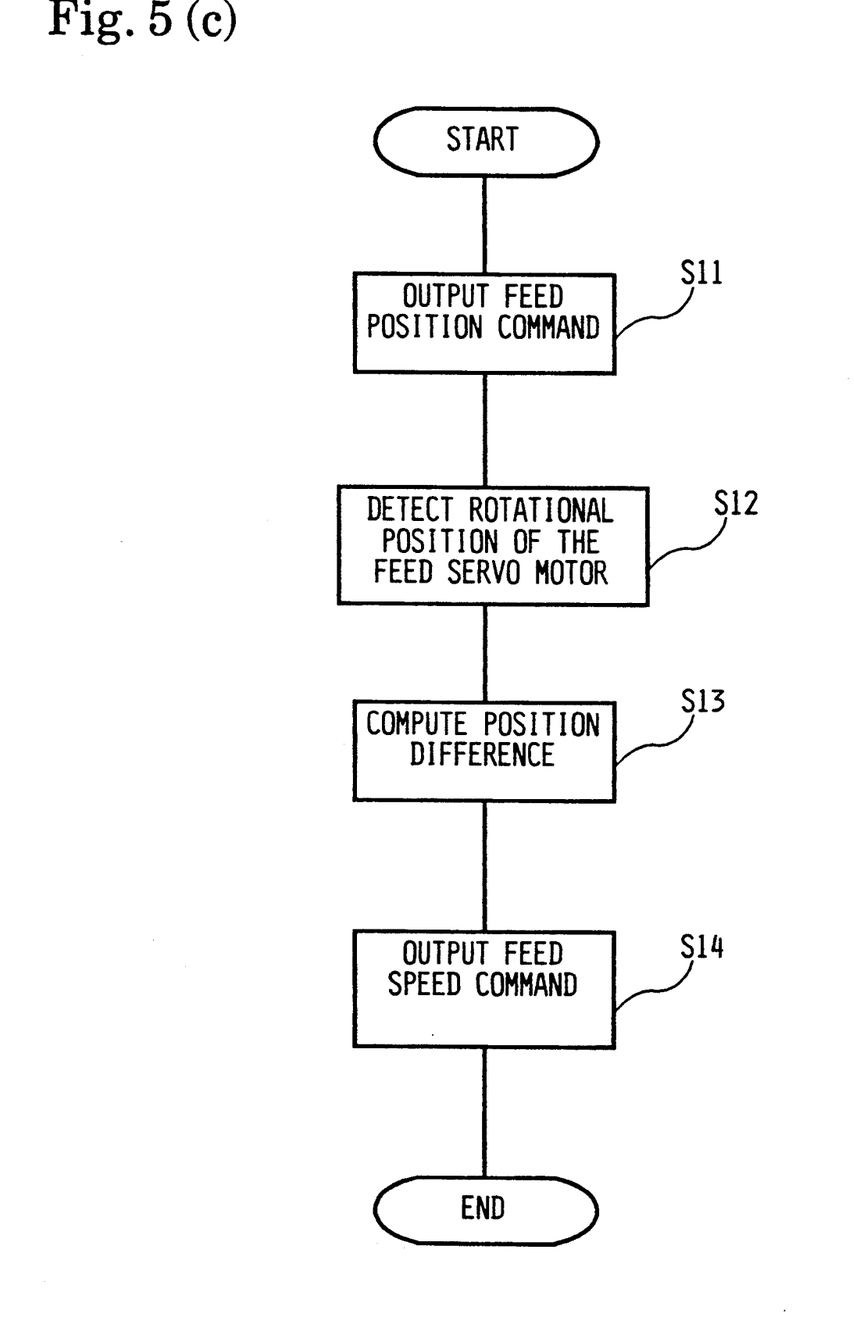
FIGS. 5(a) to 5(e) are flowcharts illustrating operations to be performed by the microcomputer.
Figure 5A:
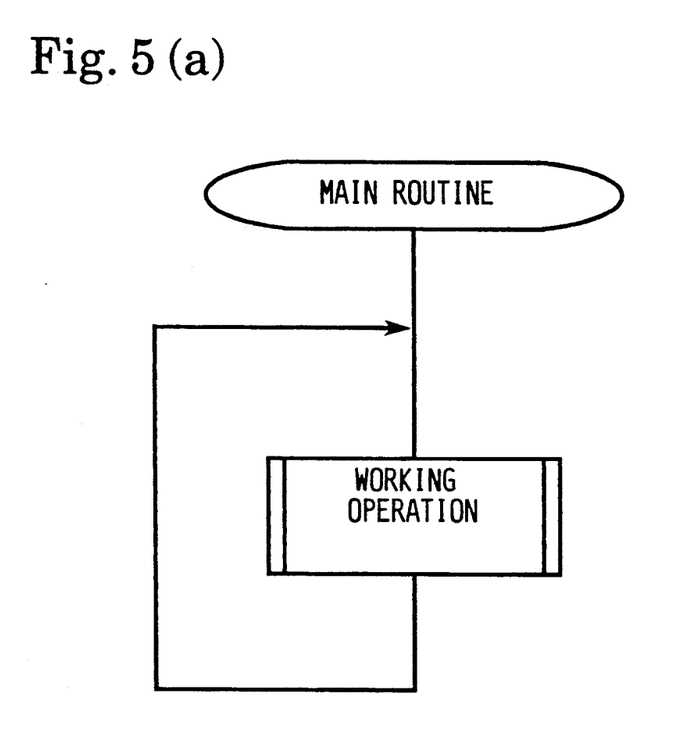

An illustrative operation performed by the single microcomputer 20 according to the above embodiment will be described below with reference to FIGS. 5(a) to 5(e). The microcomputer 20 executes a tool driving operation based on tool driving programs stored in ROM 20g as shown in FIG. 5(a). When the microcomputer 20 starts to execute a tool driving operation, the microcomputer 20 controls the rotational speed and the angular position of the spindle servo motor 5 and the feed shaft servo motor 8 as described below.

Figure 5B:
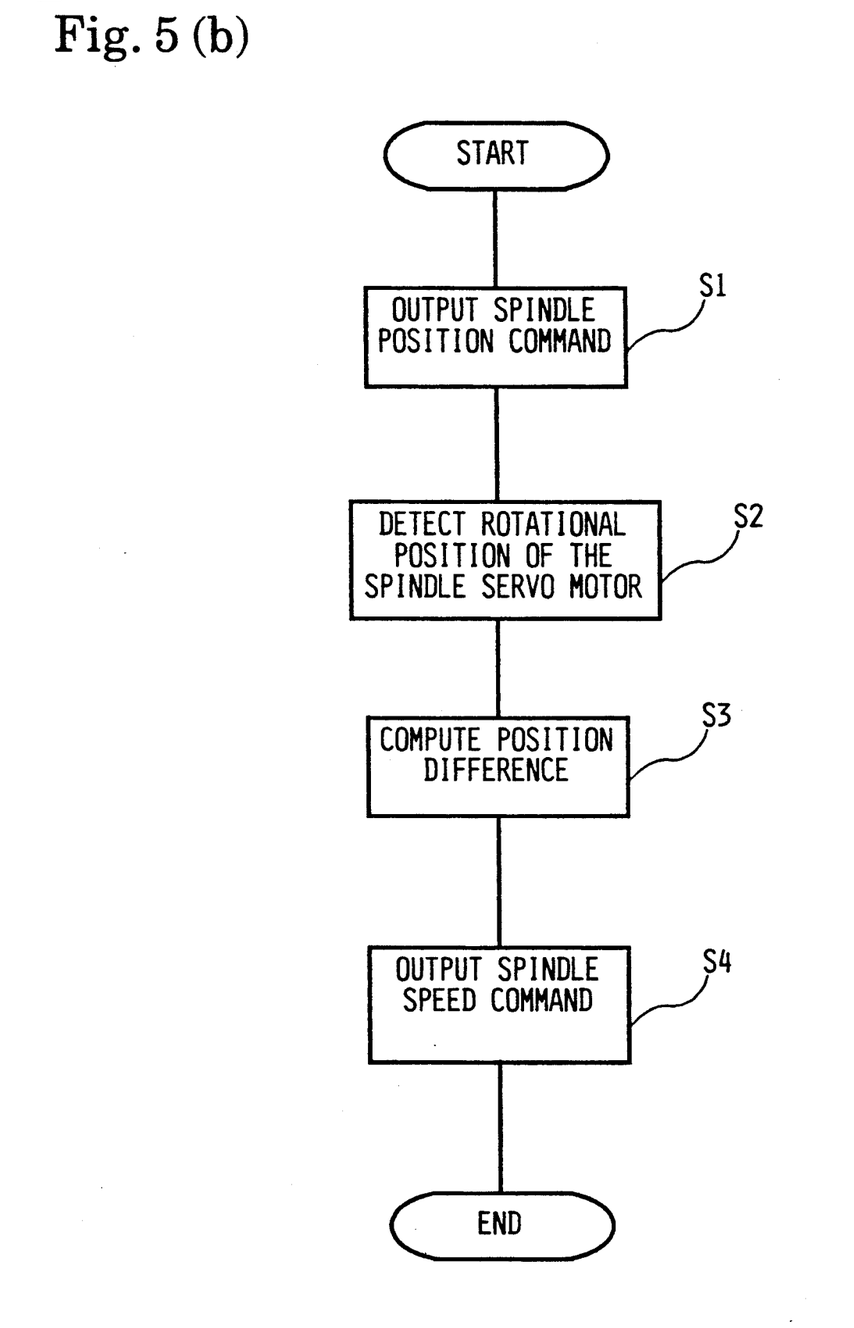

The microcomputer 20 controls the angular position of the spindle servo motor 5 based on a control program stored in ROM 20b as shown in FIG. 5(b). That is, the microcomputer 20 outputs a spindle angular position command for the spindle servo motor 5 in Step 1 (S1). The microcomputer 20 detects the angular position of the spindle servo motor 5 in Step 2 (S2). The microcomputer 20 determines a difference between the detected angular position and the commanded spindle angular position and outputs a spindle speed command in Step 3 (S3). The microcomputer 20 then outputs the spindle speed command for the spindle servo motor 5 according to the position difference determined in S3 in Step 4 (S4).

The microcomputer 20 controls the angular position of the feed shaft servo motor 8 based on a control program stored in ROM 20b as shown in FIG. 5(c). That is, the microcomputer 20 outputs a feed shaft angular position command for the feed shaft servo motor 8 in Step 11 (S11). The microcomputer 20 detects the angular position of the feed shaft servo motor 8 in Step 12 (S12). The microcomputer 20 determines a difference between the detected angular position and the feed shaft commanded angular position and outputs a feed shaft speed command in Step 13 (S13). The microcomputer 20 then outputs the feed shaft speed command for the feed shaft servo motor 8 according to the position difference determined in S13 in Step 14 (S14).

Figure 5D:
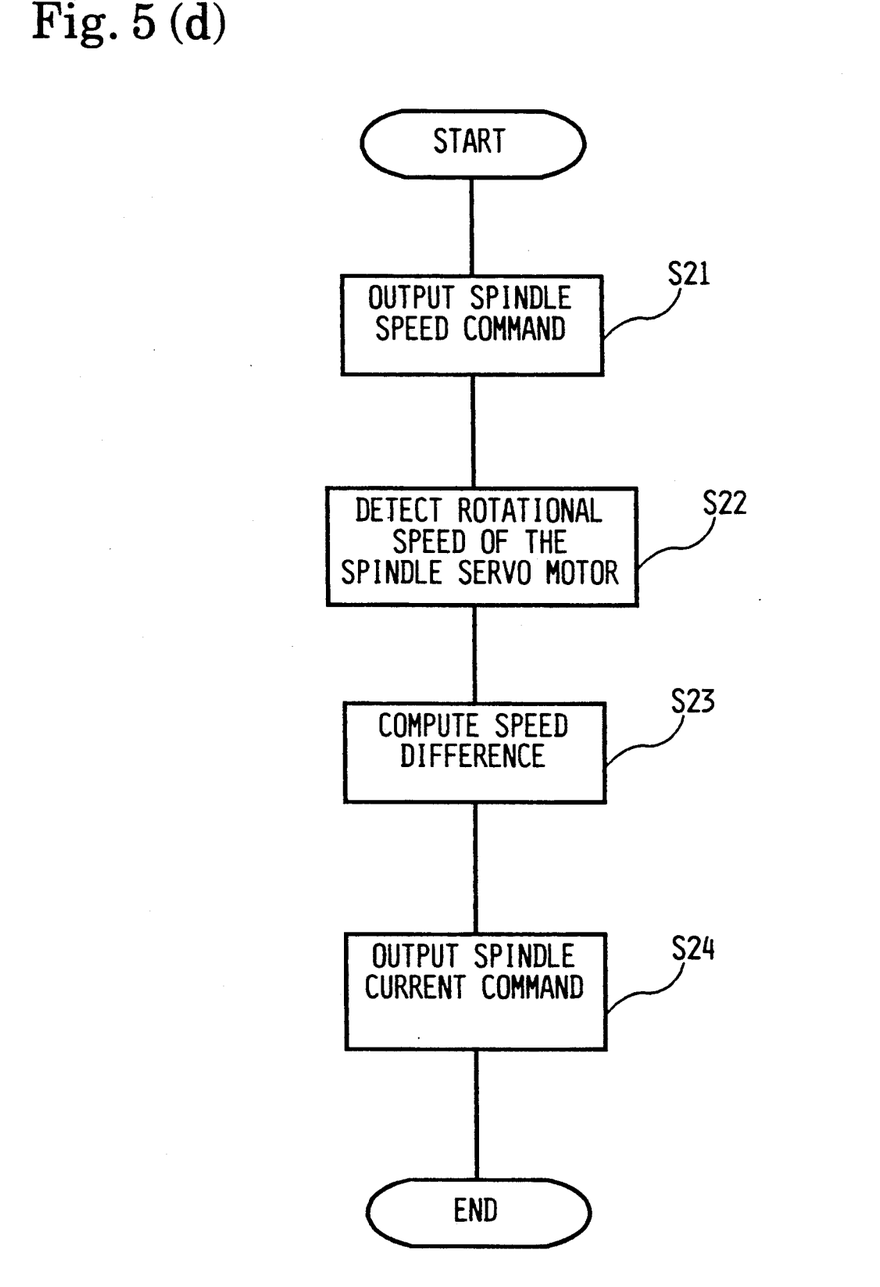

The microcomputer 20 controls the rotational speed of the spindle servo motor 5 based on a control program stored in ROM 20b as shown in FIG. 5(d). That is, the microcomputer 20 outputs a spindle speed command for the spindle servo motor 5 in Step 21 (S21). The microcomputer 20 detects the rotational speed of the spindle servo motor 5 in Step 22 (S22). The microcomputer 20 determines a difference between the detected rotational speed and the commanded spindle speed and outputs a spindle current command in Step 23 (S23). The microcomputer 20 then outputs the spindle current command for the spindle servo motor 5 according to the rotational speed difference determined in S23 in Step 24 (S24).

Figure 5E:
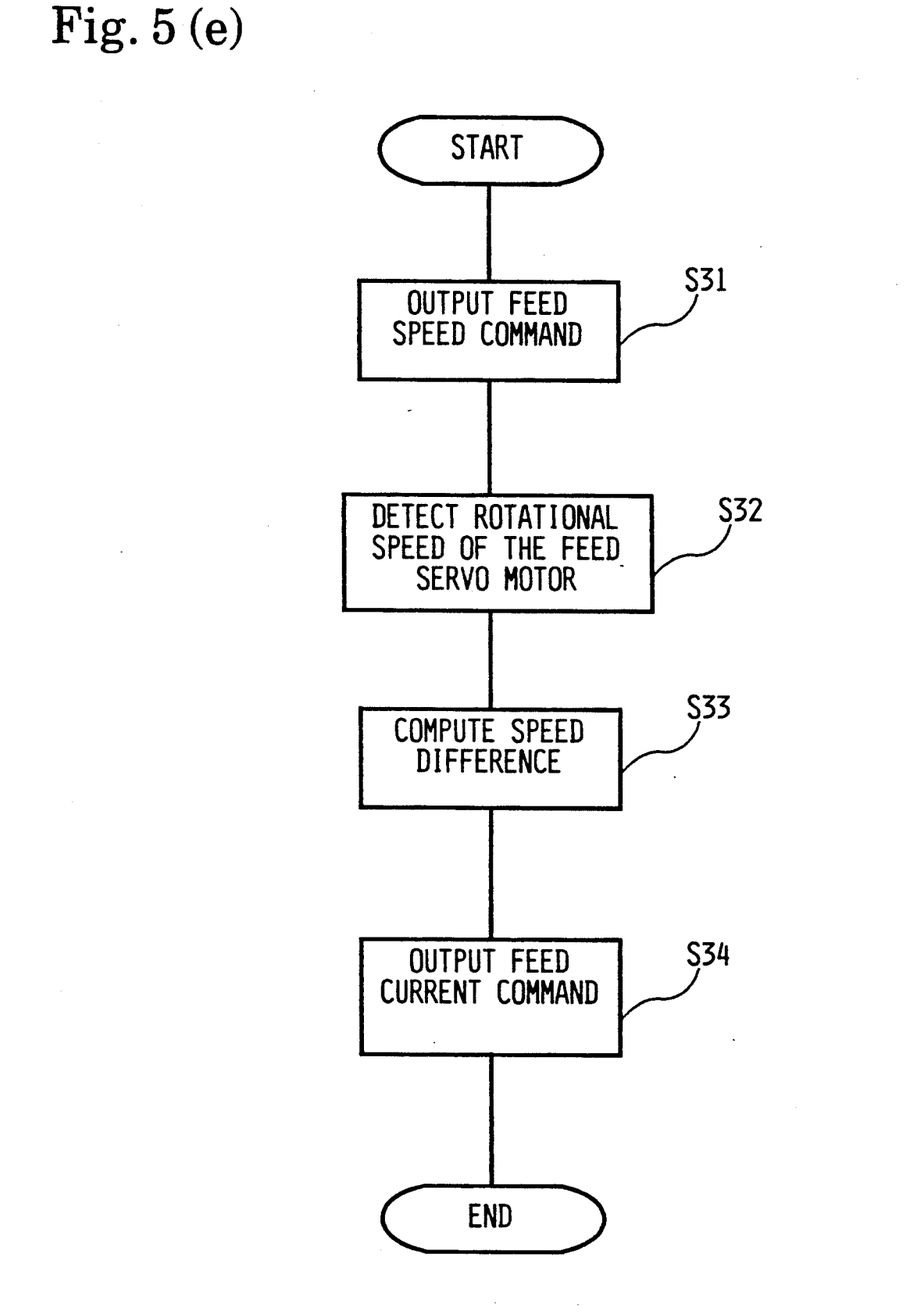

The microcomputer 20 controls the rotational speed of the feed shaft servo motor 8 based on a control program stored in ROM 20b as shown in FIG. 5 (e). That is, the microcomputer 20 outputs a feed shaft speed command for the feed shaft servo motor 8 in Step 31 (S31). The microcomputer 20 detects a rotational speed of the feed shaft servo motor 8 in Step 32 (S32). The microcomputer 20 determines a difference between the detected rotational speed and the commanded feed shaft speed and outputs a feed shaft current command in Step 33 (S33). The microcomputer 20 outputs the feed shaft current command for the feed shaft servo motor 8 according to the feed shaft speed difference determined in S33 in Step 34 (S34).

Additionally, the microcomputer 20 controls the rotational speeds and angular positions of the spindle servo motor 5 and the feed shaft servo motor 8 by using a time-division data processing mode of operation as described below and as shown in FIG. 3. As is apparent from FIG. 3, the rotational speed control of the spindle 2 and of the feed shaft (or quill) 1 are given a higher priority than the angular position control thereof, and the former is given a shorter control period than the latter. In other words, a detected speed of the servo motors 5 and 8 is compared to a commanded speed thereof, and the control of the speed of the servo motors is updated more frequently than a detected angular position of servo motors 5 and 8 is compared to a commanded angular position. This is due to the fact that a rotational speed response time of each servo motor is shorter than an angular position response time thereof.

In this preferred embodiment, a processing time SV1, SV2, etc. during which the speed is controlled for the spindle servo motor 5 occurs within a predetermined time period tv, and a processing time ZV1, ZV2, etc. during which the speed is controlled for the feed shaft servo motor 8 also occurs within the predetermined time period tv. However, the speed of the spindle servo motor 5 and of the feed shaft servo motor 8 is controlled alternately (with the spindle servo motor 5 being controlled prior to the feed shaft servo motor 8), in a time-division manner. As illustrated by the upper horizontal axis in FIG. 3, it is appreciated that the speed control period (during which servo motors 5 and 8 are controlled once) is equal to 2 tv. In contrast, a processing time SP1, SP2, etc. during which the angular position is controlled for the spindle servo motor 5 occurs within a predetermined time period tp, and a processing time ZP1, ZP2, etc. during which the angular position is controlled for the feed shaft servo motor 8 also occurs within the predetermined time period tp. However, similar to the speed control, the angular position of the spindle servo motor 5 and of the feed shaft servo motor 8 is controlled alternately (with the spindle servo motor 5 being controlled prior to the feed shaft servo motor 8), in a time-division manner. As illustrated by the lower horizontal axis in FIG. 3, it is appreciated that the position control period is equal to 2 tp.

Accordingly, by making the time of 2 tv and 2 tp sufficiently shorter than a time constant of response of the servo motors, the control device of the present invention can obtain a performance which exceeds that achieved with analog control. Further, as the control processing of the control device is carried out by a single microcomputer, the tool driving unit can be controlled with a high positional accuracy and without deterioration over long periods of use.

According to the above embodiment, there is provided a control device for a tool driving unit having a spindle servo motor adapted to be driven according to a spindle current command and a feed shaft servo motor adapted to be driven according to a feed shaft current command. Additionally, the feed shaft servo motor is arranged in coaxial relationship with the spindle servo motor, and a tool, such as a tap or a drill, is controlled to be rotated and longitudinally moved.

The control device of the present invention includes a single microcomputer (or microprocessor) having an NC control means (corresponding to NC controller 21) for reading an NC program and outputting a spindle angular position command for controlling the spindle servo motor when performing a tapping operation. The NC control means outputs both the spindle command and a first feed shaft command for controlling the feed shaft servo motor when performing a drilling operation. A thread pitch control means is provided for controlling a thread pitch and for outputting a second feed shaft command for controlling the feed shaft servo motor when performing a tapping operation. A feed shaft command selector (or, feed shaft command selector means) is provided for receiving the first feed shaft command for performing a drilling operation, and the second feed shaft command for performing a tapping operation and for selectively outputting one of those two commands as a selected feed shaft command. A spindle position control means for detecting a first angular position of the spindle servo motor, computing a first positional difference between the first angular position and the spindle command, and outputting a spindle speed command for the spindle servo motor according to the first positional difference is also provided. Additionally, spindle speed control means for detecting a first rotational speed of the spindle servo motor, determining a first speed difference between the first rotational speed and the spindle speed command, and outputting a spindle current command according to the first speed difference is provided and corresponds to spindle speed detector 25 and spindle speed controller 23. Feed shaft position control means for detecting a second angular position of the feed shaft servo motor, determining a second positional difference between the second angular position and the selected feed shaft command, and outputting a feed shaft speed command for the feed shaft servo motor according to the second positional difference is provided and corresponds to feed shaft position controller 28 and feed shaft position detector 9. A feed shaft speed control means for detecting a second rotational speed of the feed shaft servo motor, determining a second speed difference between the second rotational speed and the feed shaft speed command, and outputting a feed shaft current command according to the second speed difference is provided and corresponds to feed shaft speed detector 31 and feed shaft speed controller 29.

When performing a drilling operation, the tool selecting means receives the first feed shaft command from the NC control means. When performing a tapping operation, the feed shaft command selecting means receives the second feed shaft command from the thread pitch controlling means. Under a selected condition of the feed shaft command selecting means, the microcomputer of the control device operates as described below.

The NC control means reads the NC program and decodes the same. The NC control means then outputs the spindle command for the spindle servo motor when performing tapping, or outputs both the spindle command and the first feed shaft command for the feed shaft servo motor when performing drilling.

The spindle position control means detects a first angular position of the spindle servo motor, determines a a first positional difference between the detected first angular position and the spindle command, and outputs a spindle speed command for the spindle servo motor according to the first positional difference.

The spindle speed control means detects a first rotational speed of the spindle servo motor, determines a first speed difference between the first rotational speed and the spindle speed command, and outputs a spindle current command according to the first speed difference.

The feed shaft position control means detects a second angular position of the feed shaft servo motor, determines a second positional difference between the second angular position and the selected feed shaft command output by the feed shaft command selecting means, and outputs a feed shaft speed command for the feed shaft servo motor according to the second positional difference.

The feed shaft speed control means detects a second rotational speed of the feed shaft servo motor, determines a second speed difference between the second rotational speed and the feed shaft speed command, and outputs a feed shaft current command according to the second speed difference.

Thus, when drilling, angular position and rotational speed of the spindle servo motor and of the feed shaft servo motor are independently controlled based upon the spindle current command and the feed shaft current command output by the microcomputer. Accordingly, a drilling operation for a workpiece can be effected accurately and reliably. On the other hand, when tapping, angular position and rotational speed of the spindle servo motor and the feed shaft servo motor are synchronously controlled based upon the spindle current command and the feed shaft current command output by the microcomputer. Accordingly, the tapping operation for the workpiece can be effected accurately and reliably.

When drilling, the feed shaft command selecting means outputs a feed shaft command based solely on data provided from the NC control means. When tapping, the feed shaft command selecting means outputs a feed shaft command based at least partially on a detected angular position of the spindle shaft servo motor. The position of the feed shaft command selecting means can be changed automatically based on command data provided in the NC program.

Further, since the spindle servo motor and the feed shaft servo motor are independently controlled, and the thread pitch control means is provided for controlling the feed shaft during a tapping operation, a thread pitch can be variably controlled without replacing the transmitting parts (e.g. gears), thereby simplifying the operation and handling of the working unit. Moreover, as the rotational speed control and the angular position control of the spindle servo motor and the feed shaft servo motor are effected by a single microcomputer, it is not necessary to adjust each control component, resulting in a further contribution to a reduction in cost.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A control device for a tool driving unit wherein a tool mounted at a front end of a spindle is controlled to be rotated around a central axis of the spindle and to be longitudinally fed along the central axis of the spindle by said control device, said control device being controlled by a single microcomputer which outputs a spindle current command for driving a spindle motor to rotate the tool and a feed shaft current command for driving a feed shaft servo motor to longitudinally feed the tool, said single microcomputer comprising:

spindle position control means for detecting a first angular position of said spindle servo motor, determining a first positional difference between said first angular position and a spindle command, and outputting a spindle speed command for said spindle servo motor based on said first positional difference;

spindle speed control means for detecting a first rotational speed of said spindle servo motor, determining a first speed difference between said first rotational speed and said spindle speed command, and outputting said spindle current command based on said first speed difference;

feed shaft position control means for detecting a second angular position of said feed shaft servo motor, determining a second positional difference between said second angular position and a selected feed shaft command, and outputting a feed shaft speed command for said feed shaft servo motor based on said second positional difference; and feed shaft speed control means for detecting a second rotational speed of said feed shaft servo motor, determining a second speed difference between said second rotational speed and said feed shaft speed command, and outputting said feed shaft current command based on said second speed difference;

wherein said single microcomputer operates according to a time-division mode of operation so that said spindle position control means and said feed shaft position control means are repeatedly alternately operated, and said spindle speed control means and said feed shaft speed control means are repeatedly alternately operated.

2. The control device as defined in claim 1, wherein speed control of the spindle and of the feed shaft is performed more frequently than position control of the spindle and of the feed shaft.

3. The control device as defined in claim 1, wherein speed control of the spindle and of the feed shaft is performed during a shorter control period than position control of the spindle and of the feed shaft.

4. The control device as defined in claim 1, wherein a speed response time of each of said servo motors is shorter than a position response time thereof.

5. The control device as defined in claim 1, wherein speed control of the spindle and of the feed shaft is performed more frequently than position control of the spindle and of the feed shaft, and the speed control of the spindle and of the feed shaft is performed during a shorter control period than position control of the spindle and of the feed shaft.

6. The control device as defined in claim 1, wherein said spindle servo motor and said feed shaft servo motor are arranged in coaxial relationship to each other.

7. A control device for a tool driving unit wherein a tool mounted at a front end of a spindle is controlled to be rotated around a central axis of the spindle and longitudinally fed along the central axis of the spindle by said control device, said control device being controlled by a microcomputer which outputs a spindle current command for driving a spindle servo motor to rotate the tool and a feed shaft current command for driving a feed shaft servo motor to longitudinally feed the tool, said microcomputer comprising:

NC control means for reading an NC program and outputting a spindle command for controlling said spindle servo motor when performing a tapping operation, and for outputting said spindle command and a first feed shaft command for said feed shaft servo motor when performing a drilling operation;

thread pitch control means for controlling a thread pitch by outputting a second feed shaft command for said feed shaft servo motor when a tapping operation is performed;

feed shaft command selecting means for receiving said first feed shaft command when performing a drilling operation and for receiving said second feed shaft command when performing a tapping operation and for selectively outputting one of said feed shaft commands as a selected feed shaft command;

spindle position control means for detecting a first angular position of said spindle servo motor, determining a first positional difference between said first angular position and said spindle command, and outputting a spindle speed command for said spindle servo motor based on said first positional difference;

spindle speed control means for detecting a first rotational speed of said spindle servo motor, determining a first speed difference between said first rotational speed and said spindle speed command, and outputting said spindle current command based on said first speed difference;

feed shaft position control means for detecting a second angular position of said feed shaft servo motor, determining a second positional difference between said second angular position and said selected feed shaft command, and outputting a feed shaft speed command for said feed shaft servo motor based on said second positional difference; and feed shaft speed control means for detecting a second rotational speed of said feed shaft servo motor, determining a second speed difference between said second rotational speed and said feed shaft speed command, and outputting said feed shaft current command based on said second speed difference.

8. The control device as defined in claim 7, wherein speed control of the spindle and of the feed shaft is performed more frequently than position control of the spindle and of the feed shaft.

9. The control device as defined in claim 7, wherein speed control of the spindle and of the feed shaft is performed during a shorter control period than position control of the spindle and of the feed shaft.

10. The control device as defined in claim 7, wherein a speed response time of each of said servo motors is shorter than a position response time thereof.

11. The control device as defined in claim 7, wherein the microcomputer is a single microcomputer.

12. The control device as defined in claim 11, wherein the microcomputer is controlled according to a time-division mode of operation.

13. The control device as defined in claim 7, wherein speed control of the spindle and of the feed shaft is performed more frequently than position control of the spindle and of the feed shaft, and the speed control of the spindle and of the feed shaft is performed during a shorter control period than position control of the spindle and of the feed shaft.

14. The control device as defined in claim 7, wherein the spindle servo motor and the feed shaft motor are arranged in coaxial relationship to each other.

15. The control device as defined in claim 7, wherein said thread pitch control means determines said second feed shaft command based at least partially on said first angular position.

16. A control device for controlling a tool driving unit, the tool driving unit having a spindle servo motor, responsive to a spindle current command, for rotating a tool, and a feed shaft servo motor, responsive to a feed shaft servo command, for feeding the tool along a longitudinal axis thereof, said control device comprising:

spindle position control means for receiving a spindle command, for detecting a first angular position of the spindle servo motor, for determining a first positional difference between said first angular position and the spindle command, and for outputting a spindle speed command based on said first positional difference;

spindle speed control means for detecting a first rotational speed of said spindle servo motor, for determining a first speed difference between said first rotational speed and said spindle speed command, and for outputting the spindle current command based on said first speed difference;

feed shaft command selecting means for receiving a first and a second feed shaft command and for selectively outputting one of said first and second feed shaft commands as a selected feed shaft command based on a tooling operation being performed by said tool driving unit;

feed shaft position control means for detecting a second angular position of the feed shaft servo motor, for determining a second positional difference between said second angular position and said selected feed shaft command, and for outputting a feed shaft speed command based on said second positional difference; and feed shaft speed control means for detecting a second rotational speed of said feed shaft servo motor, for determining a second speed difference between said second rotational speed and said feed shaft speed command, and for outputting the feed shaft current command based on said second speed difference.

17. The control device of claim 16, further comprising:

thread pitch control means for controlling a thread pitch by determining and outputting said second feed shaft command to said feed shaft command selecting means.

18. The control device of claim 17, wherein said thread pitch control means determines said second feed shaft command when a tapping operation is to be performed by said tool driving unit.

19. The control device of claim 17, wherein said thread pitch control means determines said second feed shaft command based at least partially on said first angular position of said spindle servo motor.

20. The control device of claim 16, wherein said spindle and feed shaft speed control means output said spindle and feed shaft current commands, respectively, at a faster rate than said spindle and feed shaft position control means output said spindle and feed shaft speed commands, respectively.

21. The control device of claim 16, wherein said spindle and feed shaft speed control means determine and output said spindle and feed shaft current commands, respectively, in a shorter time period than said spindle and feed shaft position control means determine and output said spindle, and feed shaft speed commands, respectively.

22. The control device of claim 20, wherein said spindle and feed shaft speed control means determine and output said spindle and feed shaft current commands, respectively, in a shorter time period than said spindle and feed shaft position control means determine and output said spindle and feed shaft speed commands, respectively.

* * * * *